United States Patent [19]

Sultan et al.

[11] Patent Number: 4,916,592
[45] Date of Patent: Apr. 10, 1990

[54] CENTER HIGH MOUNTED STOPLIGHT

[75] Inventors: Michael F. Sultan, Troy; Michael J. O'Rourke, Sterling Heights, all of Mich.

[73] Assignee: General Motors Corporation, Detroit, Mich.

[21] Appl. No.: 394,916

[22] Filed: Aug. 17, 1989

[51] Int. Cl.$^4$ .............................................. B60Q 1/26
[52] U.S. Cl. ...................................... 362/80; 362/32; 362/299; 362/328; 340/479
[58] Field of Search .................. 362/321, 61, 80, 299, 362/308, 328; 340/468, 479

[56] References Cited

U.S. PATENT DOCUMENTS 4,626,967 12/1986 Segoshi ............................ 362/80 X
4,791,534 12/1988 Lindberg ............................... 362/80

Primary Examiner—Stephen F. Husar
Attorney, Agent, or Firm—Edward J. Biskup

[57] ABSTRACT

A central high mounted stoplight arrangement for a motor vehicle that utilizes an optical prism coupler mounted on the rear deck lid at the center thereof for receiving and projecting light rays to the rear of the vehicle.

3 Claims, 1 Drawing Sheet

U.S. Patent
Apr. 10, 1990
4,916,592
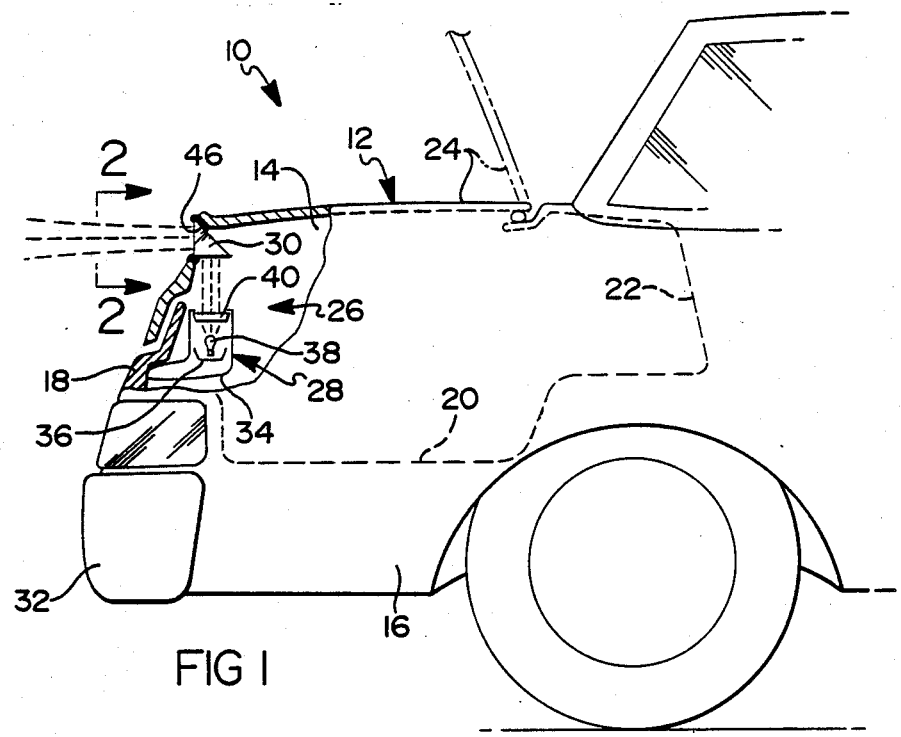
FIG 1
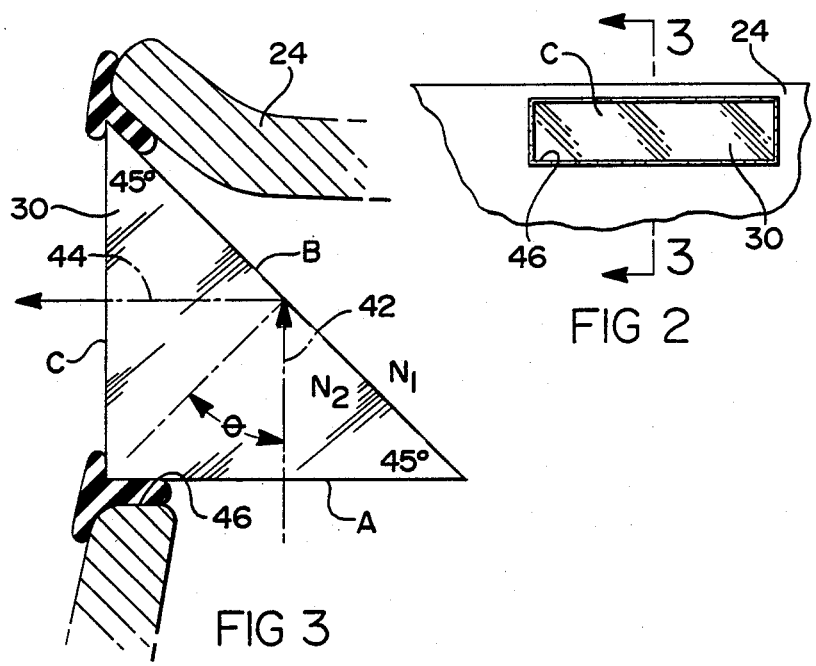
FIG 2
FIG 3

CENTER HIGH MOUNTED STOPLIGHT

This invention concerns vehicle brake lights and more particularly relates to a so-called center high mounted stoplight which in the last few years has been required to be placed on U.S. motor vehicles.

At times it is desirable for styling purposes to install a center high mounted stoplight directly on the truck lid rather than behind the vehicle back-lite. Placing the stoplight on the deck lid, however, can create some problems not the least of which is accessibility to the light bulb if the latter should burn out. Wire routing to the stoplight bulb on the deck lid can also be a problem because of the usual two-piece construction of the deck lids not providing suitable passageways for easily feeding the wires to the light bulb.

Accordingly, the present invention is directed to a center high mounted stoplight for use with the deck lid of a vehicle that provides a simple and low cost solution to the above problems. Simply stated, the present invention utilizes a conventional stoplight that is installed in the trunk adjacent the rear bumper of the vehicle in a manner so that the light beam is directed vertically upwardly. In addition, an optical prism coupler is mounted in the center of the deck lid and serves to intercept the light beam emanating from the stoplight and redirects the light beam horizontally in a rearward direction.

The objects of the present invention are to provide a new and improved stoplight arrangement for a motor vehicle that utilizes an optical prism coupler mounted on the deck lid for receiving and projecting light rays to the rear of the vehicle; to provide a new and improved center high mounted stoplight for a motor vehicle in which the stoplight assembly is mounted in the trunk so as to provide a vertically directed beam which is intercepted by an optical element supported by the rear deck lid and redirected horizontally rearwardly of the motor vehicle; to provide a new and improved center high mounted stoplight for a motor vehicle in which a reflector element is mounted in the deck lid at a rear portion thereof and receives a beam of red light from a light source located within the trunk adjacent the bumper of the motor vehicle; and to provide a new and improved warning light arrangement for a motor vehicle in which a movable closure member of the vehicle supports a reflective member which receives a beam of light from a light source mounted in a fixed position within the vehicle.

Other objects and advantages of the present invention will be more apparent from the following detail description when taken with the drawings in which FIG. 1 is an elevational view of the rear end of a motor vehicle that is partially sectioned so as to disclose a center high mounted stoplight made in accordance with the present invention;

FIG. 2 is a view taken on line 2—2 of FIG. 1 showing the optical member which forms a part of the present invention; and FIG. 3 is an enlarged view of the optical member taken on line 3—3 of FIG. 2.

Referring now to the drawings and more particularly FIG. 1 thereof, the rear end of a motor vehicle 10 is shown which includes the usual trunk 12 for carrying luggage and the like. The trunk 12 consists of a compartment 14 defined by the body structure of the vehicle such as the laterally spaced rear fenders (one of which is shown and identified by reference numeral 16) a rear body panel 18 which extends transversely of the vehicle, a floor pan 20, the rear part of a seat back 22, and a deck lid 24. As is conventional, the deck lid 24 is supported by hinge means (not shown) for pivotal movement above a horizontal axis between the closed position shown in full lines and an open position shown in phantom lines.

A center high mounted stoplight 26 is incorporated with the trunk 12 in accordance with the present invention and, in the preferred form, includes a light source 28 mounted within the compartment 14 and an optical prism member 30 which is carried by the rear portion of the deck lid at the center thereof. The optical prism member 30 is triangular in cross section and is defined by sides A, B and C. Sides A and C intersect at an angle of 90° while sides C and B, and A and B each intersect at an angle of 45°. More specifically, the light source 28 is fixed to the inner surface of the panel 18, which in turn, is located above the rear bumper 32 of the vehicle 10. The light source 28 includes a housing 34 which supports a parabolic reflector 36, a light bulb 38, and a lens 40 which normally would be colored red. The light bulb 38 is intended to be energized whenever the brake pedal of the vehicle 10 is depressed so as to indicate to a following vehicle that the vehicle brakes are being applied. Also, the reflector 36 is positioned so that the light rays emanating from the light bulb are directed upwardly towards the optical prism member 30. Thus, when the deck lid 24 is closed and the brakes are applied by the vehicle driver, the light rays of the light bulb 38 are directed by the reflector 36 through the colored lens 40, and as seen in FIG. 3, the colored light rays then enter the optical prism member 30 at side A as indicated by the arrow 42 and are redirected by the inclined side B of the prism member 30 through side C in a rearward horizontal direction as indicated by the arrow 44.

The condition for total internal reflection of the light rays by the optical prism member 30 requires that the incidence angle $\theta$ which in this case is 45°, must exceed the critical angle $\theta_c$ given by the equation $$\theta_c = \sin^{-1}\left(\frac{\eta_1}{\eta_2}\right)$$

where $\eta_1$ is the index of refraction of the surrounding medium (in this case air) and $\eta_2$ is the index of refraction of the coupler medium. For example, if the prism 30 is made from a plastic material such as polymethylmetacrylate where $\eta_2 \simeq 1.49$, then $\theta_c$ will equal 42.1°. If polycarbonate is used as the material for the prism 30, then $\eta_2 = 1.59$ and $\theta_c = 39°$. Thus, the incidence angle (45°) of the prism 30 would exceed the critical angle in both cases and provide the total internal reflection desired.

As seen in FIG. 1, the prism 30 when viewed from side C is generally rectangular in configuration and is surrounded by and supported within a rectangular opening 46 formed in the deck lid 24 by a flexible urethane adhesive or other flexible means and also suitable support means (not shown) so as to permit the prism member 30 to absorb vibrations and shocks during movement of the vehicle and when the deck lid is closed.

Various changes and modifications can be made in this construction without departing from the spirit of the invention. Since such changes and modifications are contemplated by the inventors, they do not wish to be limited except by the scope of the appended claims.

The embodiments of the invention in which an exclusive property or privilege is claimed are defined as follows:

1. In combination with a motor vehicle body the rear end of which is provided with a trunk adapted to be closed by a deck lid supported for pivotal movement about a horizontal axis, a brake light mounted in said trunk for projecting a beam of light in an upward direction, and an optical coupler supported by said deck lid above said brake light for intercepting said beam of light and causing said beam of light to be reflected in a substantially horizontal direction outwardly rearwardly from said deck lid when said deck lid is in a closed position and said brake light is energized.

2. In combination with a motor vehicle body the rear end of which is provided with a trunk adapted to be closed by a deck lid supported for pivotal movement about a horizontal axis, a brake light including a light bulb and reflector mounted in said trunk in the rear portion thereof for projecting a beam of light in an a vertically upward direction, and an optical prism coupler supported by said deck lid above said brake light for intercepting said beam of light and causing said beam of light to be reflected in a substantially horizontal direction outwardly rearwardly from said deck lid when said deck lid is in a closed position and said brake light is energized.

3. In combination with a motor vehicle body, the rear end of which is provided with a trunk adapted to be closed by a deck lid supported for pivotal movement about a horizontal axis, a brake light comprising a housing having a light bulb, a reflector and a colored lens, said brake light being mounted in said trunk adjacent the rear bumper for projecting a beam of light in an upward direction, and an optical prism coupler supported by said deck lid above said brake light for intercepting said beam of light and causing said beam of light to be reflected in a substantially horizontal direction outwardly rearwardly from said deck lid when said deck lid is in a closed position and said brake light is energized.

* * * * *

UNITED STATES PATENT AND TRADEMARK OFFICE
CERTIFICATE OF CORRECTION

PATENT NO.  :  4,916,592
DATED       :  April 10, 1990
INVENTOR(S) :  Michel F. Sultan and Michael J. O'Rourke It is certified that error appears in the above-identified patent and that said Letters Patent is hereby corrected as shown below:

Abstract and Title page: "Inventors: Michael F. Sultan, Troy; Michael J. O'Rourke, Sterling Heights, all of Mich." should read -- Inventors: Michel F. Sultan, Troy; Michael J. O'Rourke, Sterling Heights, all of Mich. --

Signed and Sealed this

Fifth Day of November, 1991

Attest:

HARRY F. MANBECK, JR.

*Attesting Officer*        *Commissioner of Patents and Trademarks*